US 6,568,120 B2

(12) United States Patent
Smolinski

(10) Patent No.: US 6,568,120 B2
(45) Date of Patent: May 27, 2003

(54) ICE FISHING TRAP

(76) Inventor: Kasmir Smolinski, P.O. Box 212, Clandeboye, Manitoba (CA), R0C 0P0

( * ) Notice: Subject to any disclaimer, the term of this patent is extended or adjusted under 35 U.S.C. 154(b) by 0 days.

(21) Appl. No.: 09/860,536

(22) Filed: May 21, 2001

(65) Prior Publication Data

US 2001/0045047 A1 Nov. 29, 2001

(51) Int. Cl.$^7$ .............................................. A01K 97/01
(52) U.S. Cl. ........................................... 43/5; 43/4
(58) Field of Search ...................... 43/4, 4.5, 58, 65, 43/66, 77, 100, 5

(56) References Cited

U.S. PATENT DOCUMENTS

| | | | | | |
|---|---|---|---|---|---|
| 1,148,587 A | * | 8/1915 | Holman | ............................ | 43/1 |
| 1,421,610 A | * | 7/1922 | Svehla | ............................ | 43/77 |
| 1,421,611 A | * | 7/1922 | Svehla | ............................ | 43/77 |
| 1,848,541 A | * | 3/1932 | Norberg | ............................ | 43/77 |
| 2,083,062 A | * | 6/1937 | Hampton | ...................... | 175/240 |
| 2,493,100 A | * | 1/1950 | Adams, Jr. | .................... | 43/100 |
| 2,680,922 A | * | 6/1954 | Welfl | ............................ | 43/1 |
| 3,123,930 A | * | 3/1964 | Rimar | ............................ | 43/5 |
| 3,267,603 A | * | 8/1966 | Josephs et al. | ................... | 43/5 |
| 3,477,163 A | * | 11/1969 | O'Connell et al. | .............. | 43/5 |
| 3,541,722 A | * | 11/1970 | Garrison | ............................ | 43/4 |
| 3,722,940 A | * | 3/1973 | Misjak | ............................ | 43/4 |
| 3,885,341 A | * | 5/1975 | Kuchenbecker et al. | ......... | 43/5 |
| 4,356,087 A | * | 10/1982 | Miles | ............................ | 43/5 |
| 4,603,502 A | * | 8/1986 | MacDonald | .................... | 43/41 |
| 4,718,188 A | * | 1/1988 | Roberts | ............................ | 43/4 |
| 4,747,226 A | * | 5/1988 | Todd | ............................ | 43/4 |
| 4,794,718 A | * | 1/1989 | Tillman | ............................ | 43/4 |
| 4,866,872 A | * | 9/1989 | Guilbault et al. | ................. | 43/4 |
| 5,048,220 A | | 9/1991 | Harris | ............................ | 43/4 |
| 5,140,767 A | | 8/1992 | Traut | ............................ | 43/4 |
| 5,146,999 A | * | 9/1992 | Wiser et al. | ................. | 175/254 |
| 5,218,777 A | | 6/1993 | Olszowka et al. | ................ | 43/4 |
| 5,465,522 A | * | 11/1995 | Varda | ............................ | 43/4 |
| 5,784,824 A | * | 7/1998 | Myroniuk | ........................ | 43/4 |
| 5,845,431 A | * | 12/1998 | Waite | ........................... | 43/100 |
| 5,974,725 A | * | 11/1999 | Knight | ............................ | 43/66 |
| 6,014,834 A | * | 1/2000 | Ferland | ........................ | 43/121 |

* cited by examiner

Primary Examiner—Darren W. Ark
(74) Attorney, Agent, or Firm—Ryan W. Dupuis; Adrian D. Battison; Michael R. Williams

(57) ABSTRACT

An ice fishing trap is provided to be suspended within an ice fishing hole such that once a fish has been pulled partway through the hole the fish will remain caught even if the fish is freed from the fishing line having initially caught the fish thereon. A collar is suspended within the ice fishing hole by a pair of support arms arranged to rest on a top side of the sheet of ice in which the ice fishing hole is bored. A plurality of gate members are pivotally mounted about a periphery of the collar to extend radially inward therefrom. Each gate member is a wedge shaped member having a blunt end positioned adjacent the center of the opening of the collar in the closed position. The blunt ends of the gate members are arranged to grip a fish therebetween as they are pivoted upward into an open position to grip the fish even if the fish is only pulled partway therethrough.

18 Claims, 3 Drawing Sheets

FIG. I

ICE FISHING TRAP

FIELD OF THE INVENTION

This invention relates to a trap and more particular to a trap for use with an ice fishing hole.

BACKGROUND

Ice fishing is a common activity in colder climates which involves boring an ice fishing hole through a sheet of ice which lies over a body of water, for example a river or lake having fish therein. Once the ice fishing hole is bored, the hole typically fills partway with water from the underlying body of water which rises up through the hole. The individuals proceed to fish by inserting fishing lines through the hole. Once a fish is caught on the end of one of the fishing lines, the line and the fish caught thereon are pulled up through the ice fishing hole.

A common problem when pulling a fish up through an ice fishing hole involves the fish coming loose from the fishing line such that the fish is lost by falling back into the ice fishing hole. This can occur, for example, as a result of the change in buoyancy of the fish as the fish is pulled from the water causing the fish to tear loose from the fishing line or as a result of a break in the fishing line as the fish fights from being pulled from the water. Once the fish is free from the fishing line, it generally cannot be recovered and is undesirably lost into the water.

U.S. Pat. No. 5,140,767 to Traut provides a manually actuated gate which is positioned within an ice fishing hole by an elongate handle. The gate is a significant obstruction to fish passing through the hole even when in an open position. The requirement for manual activation and the use of a single gate member makes it difficult to catch a fish until the fish has been pulled completely past the gate member otherwise the fish will likely be lost.

U.S. Pat. No. 5,218,777 to Olszowka provides a gate for positioning across the opening within an ice fishing hole, wherein the gate is supported on a frame within the hole by an elongate handle. The gate is an open mesh which makes it difficult to thread a fishing line past the gate. If the fishing line is threaded through the mesh any fish subsequently caught on the fishing line will be directed into the mesh of the gate as opposed to be pulled past the gate. The frame supporting the gate thereon provides a further obstruction to fish which are attempted to be pulled past the gate. Also as noted above, the use of a single gate member makes it difficult to catch a fish until the fish has been pulled completely past the gate.

U.S. Pat. No. 5,048,220 to Harris provides an ice fishing trap having an elongate tubular housing for positioning within an ice fishing hole, wherein the housing has a single gate member mounted across a bottom end thereof. The gate member is a plate pivotally mounted on the housing and having a slot at a free end thereof for receiving a fishing line therethrough. The minimal clearance of the slot would make it very difficult to thread a fishing line therethrough without having to pull the entire trap out of the ice fishing hole. Furthermore as also noted above, the single gate member does not allow a fish to be caught partway through but rather requires the fish to be pulled completely past the gate such that the gate closes behind the fish in order to trap the fish within the ice fishing hole.

SUMMARY

According to the present invention there is provided a trap for trapping a fish within an ice fishing hole, the trap comprising:

a frame arranged to extend across the hole, the frame having an opening extending therethrough between respective top and bottom sides thereof;

a support extending outwardly from the frame for suspending the frame therefrom within the hole;

a plurality of retainer members mounted on the frame at spaced positions around a periphery of the opening, the retainer members being movable between a closed position wherein the retainer members extend inwardly from the periphery of the opening to respective free ends suspended partway across the opening and an open position wherein the retainer members extend upwardly from the periphery of the opening so as to permit passage of the fish through the opening;

and stop means arranged to restrict downward movement of the retainer members in the closed position.

The use of multiple retainer members as in the present invention defines a plurality of gates, each extending only part way across the opening of an ice fishing hole such that each gate terminates at a free end positioned adjacent a center of the ice fishing hole. In this arrangement a fish is gently guided through the center of the opening free from obstruction of the frame of the trap. When a fish is pulled partway through the opening in the frame the free ends of the gates engage opposing sides of the fish to grip the fish therebetween. Multiple gates further permits different lengths of gates to be used for gripping the fish at different longitudinal positions along the fish which is being pulled in an upright direction through the opening to further secure a fish therein even if the fish has only been pulled partway through the opening.

Each retainer member is preferably a generally triangular member extending from a base thereof mounted on the frame and tapering inwardly towards the free end thereof. In this arrangement a plurality of the retainer members are able to substantially enclose a circular opening in a closed position.

The retainer member may be evenly spaced circumferentially about the opening so as to provide a space between each adjacent pair of retainer member which allows a fishing line to be easily threaded therethrough.

There may be provided at least two different sizes of retainer members spanning across the opening in varying amounts in the closed position so as to grip a fish therebetween when the flaps are in the open position at multiple locations along the fish.

The multiple configurations of retainer members may comprise a plurality of primary retainer members each having a free end which is positioned adjacent a centre of the opening in the closed position and a plurality of secondary retainer members mounted between the respective primary retainer members wherein each secondary retainer member extends only partway towards the centre of the opening in the closed position.

The free end of each retainer member may comprise a blunt gripping end for engaging a fish between the respective free ends of the retainer members as a fish is pulled therethrough without damaging the fish.

The free end of each retainer member may be formed of a gripping material to further assist in gripping the fish.

Each retainer member may comprise a substantially smooth and flat plate member so as not to inhibit passage of the fish therethrough until the fish is restricted between the respective free ends of the retainer members.

The retainer members may be formed of a substantially transparent material. The use of transparent material makes the retainer members less visible to fish such that the fish is less likely to fight being pulled therethrough.

The stop means may comprise a shoulder on the frame, wherein each retainer member is mounted on the frame such that a portion of the retainer member rests on the shoulder in the closed position.

Alternatively the stop means may comprise a stop associated with each retainer member, each stop being mounted on the frame for restricting pivotal movement of the retainer member in a downward direction towards the bottom side of the frame from the closed position.

The frame may comprise a sleeve of rigid material, the sleeve being suitably sized to fill a conventional size ice fishing hole. The sleeve provides a suitable opening for passage of a fish therethrough with minimal obstruction.

In one arrangement, there may be provided a hinge mounting each retainer member on the frame for pivotal movement of the respective free ends of the retainer members relative to the frame.

Alternatively, each retainer member may include a base of flexible material opposite the free end thereof which mounts the corresponding retainer member on the frame for relative pivotal movement by flexing the base. Any arrangement which allows the free ends of the respective retainer members to be displaced upwardly and outwardly along a substantially arcuate path would be suitable.

The support may comprise at least one support arm extending upward from the top side of the frame, the support arm mounting a handle thereon which extends radially outward from the support arm to engage a top side of a sheet of ice in which the ice fishing hole is located and suspend the frame therefrom.

There may be provided an adjustable mount mounting the handle on the support arm such that the handle is adjustable in height relative to the support arm for suspending the frame within an ice fishing hole at different relative heights.

A pair of the support arms may be mounted on the frame on diametrically opposed sides of the opening, each support arm mounting a handle thereon. This provides a stable arrangement for easily lifting the trap from the hole.

The support arm may include at least one folding joint therein such that the support arm is collapsible in length for storage.

There may be provided a plurality of evenly spaced markings along the support arm for indicating a depth at which the frame is suspended within an ice fishing hole.

BRIEF DESCRIPTION OF THE DRAWINGS

In the accompanying drawings, which illustrate exemplary embodiments of the present invention.

DETAILED DESCRIPTION

Figure 1:
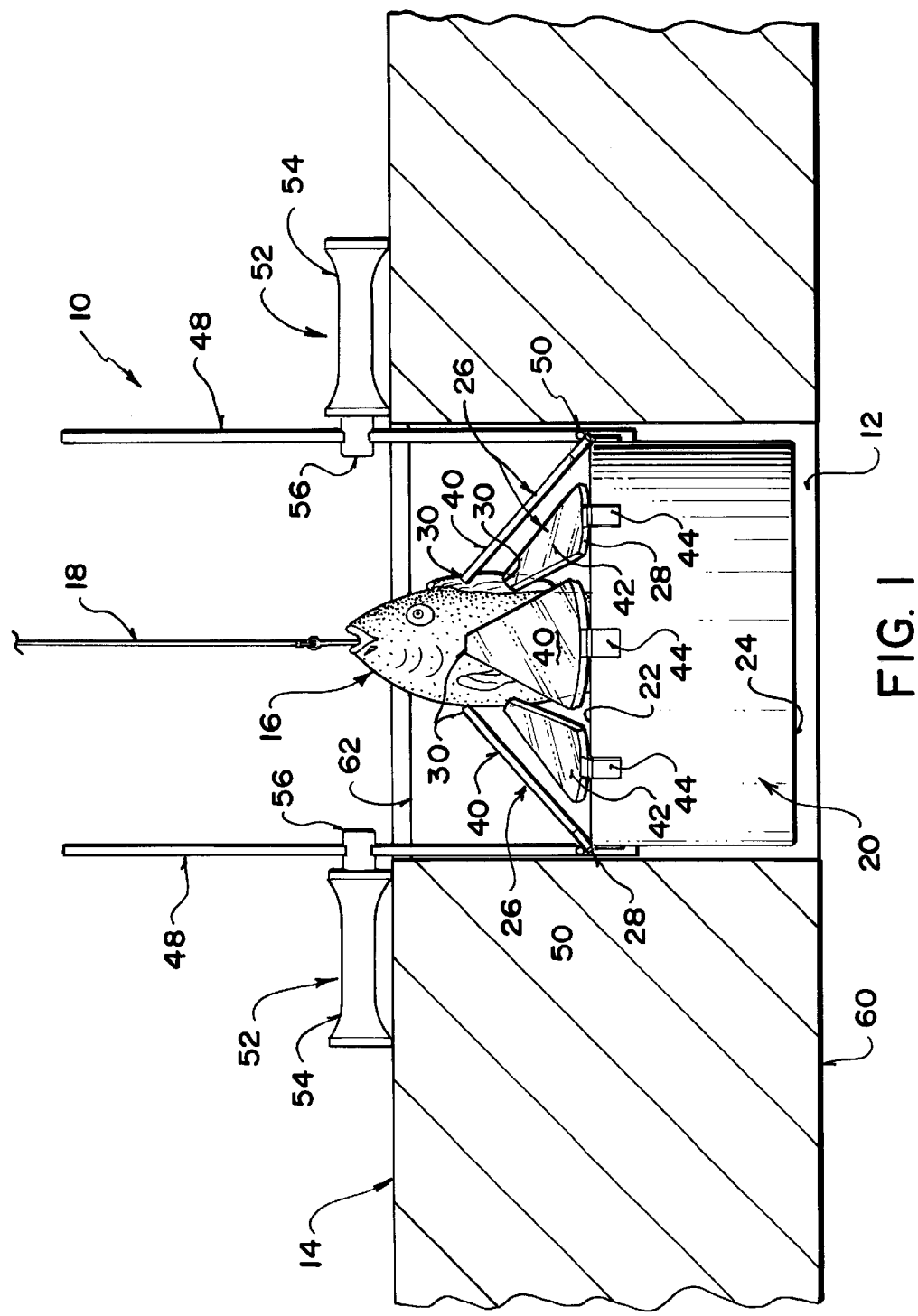
FIG. 1 is a side elevational view of the trap shown mounted in an ice fishing hole with a fish being pulled partway through the trap.

Referring to the accompanying drawings, there is illustrated an ice fishing trap generally indicated by reference numeral 10. The trap 10 is for use in an ice fishing hole 12 which is bored into a sheet of ice 14 lying over a body of water, for example a lake or river. The trap 10 serves to trap a fish 16 which has been caught on a fishing line 18 to be pulled up through the ice fishing hole.

The trap 10 generally comprises a collar 20 formed of a smooth rigid material, for example metal or plastic, and is suitably sized to fit within a conventional ice fish hole 12 so as to fill the entire circumference of the hole and to provide little obstruction to a fish passing therethrough. The collar 20 thus defines an opening therethrough between respective top and bottom sides 22 and 24 of the collar.

A plurality of retainer members 26 are mounted about a periphery of the opening in the collar 20 on the top side 22 thereof. Each retainer member 26 is a generally triangularly shaped gate mounted on the collar at a base 28 to extend radially inwardly across the opening to a terminal free end 30. The retainer members 26 are formed of a smooth flat plate of transparent material having bevelled edges so as to provide minimal resistance to a fish passing therethrough. The transparent material makes it more difficult for the fish to see the retainer members and the fish are thus less likely to resist being pulled therethrough.

The free ends 30 of the respective retainer members 26 each define a blunt end which can be formed of a gripping material so as to provide further gripping action to a fish positioned therebetween. The retainer members 26 are evenly spaced circumferentially about the opening so as to define respective spaces between each pair of adjacent retainer members. The spaces between the retainer members as well as between the respective free ends thereof permit easy passage of a fishing line 18 having a hook mounted thereon without the need to pull the trap 10 out of the ice fishing hole in order to thread the fishing line there through. The spaces extend diametrically across the opening in the collar to permit jigging of a fishing line inserted therethrough.

The retainer members include a plurality of primary gates 40 and a plurality of secondary gates 42. The free end 30 of each primary gate is located adjacent the center of the opening whereas the free end 30 of each secondary gate 42 terminates only partway towards the center on the opening. The primary and secondary gates are positioned so that a secondary gate 42 is located between each adjacent pair of primary gates.

As shown in FIG. 1, when a fish is pulled partway through the opening, the longer primary gates extend upwardly higher than the shorter secondary gates so as to grip the fish between respective free ends thereof at multiple longitudinal positions along the fish. This further ensures that a fish is gripped by the trap even if the fish is only pulled partway there through. If a fish as shown in the position of FIG. 1 were to fight the trap, the secondary gates 42 would be permitted to fall into the closed position of FIG. 2 to further restrict movement of the fish backwards through the opening and into the underlying body of water.

Figure 2:
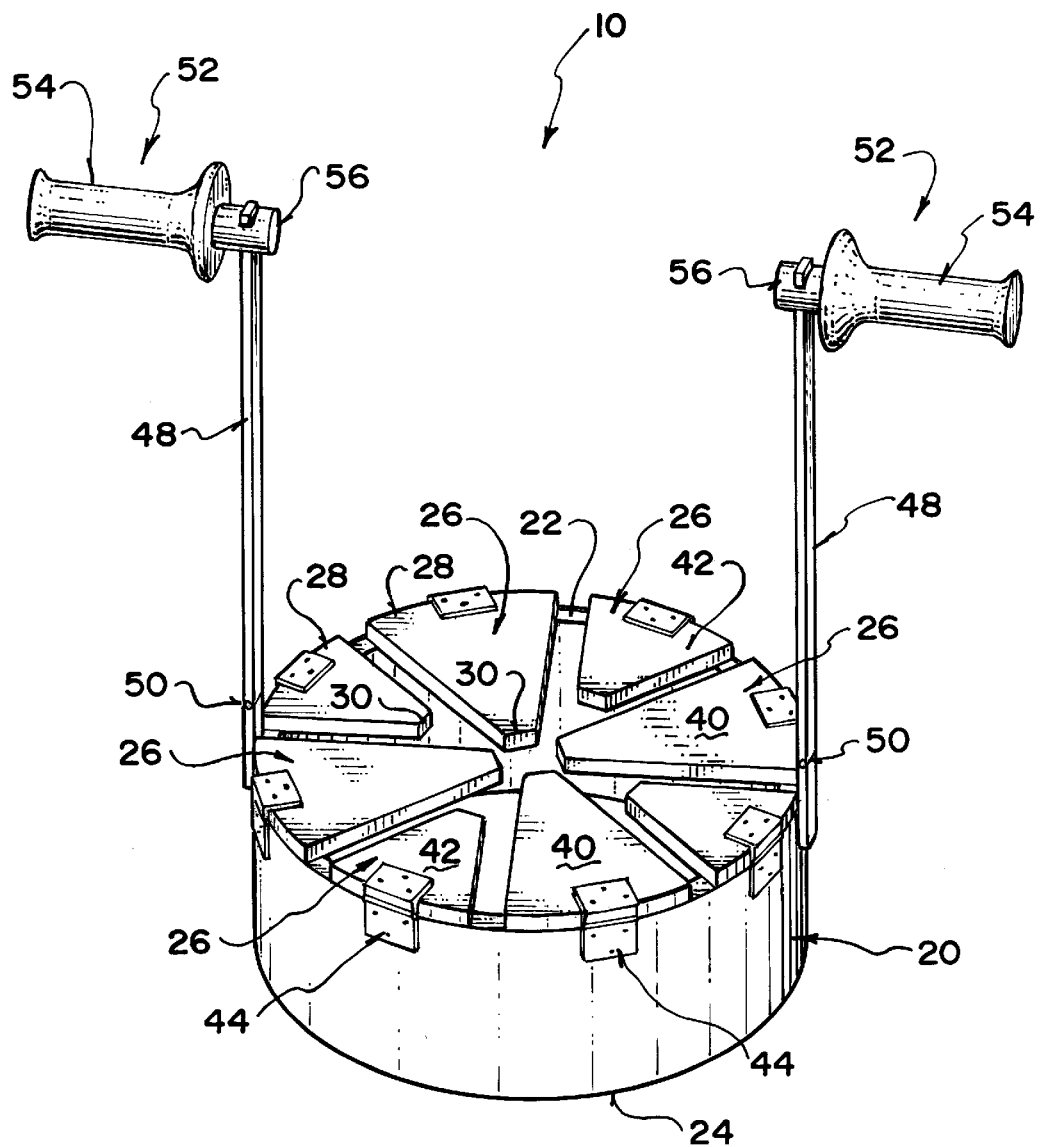
FIG. 2 is an isometric view of the trap according to FIG. 1.
Figure 3:
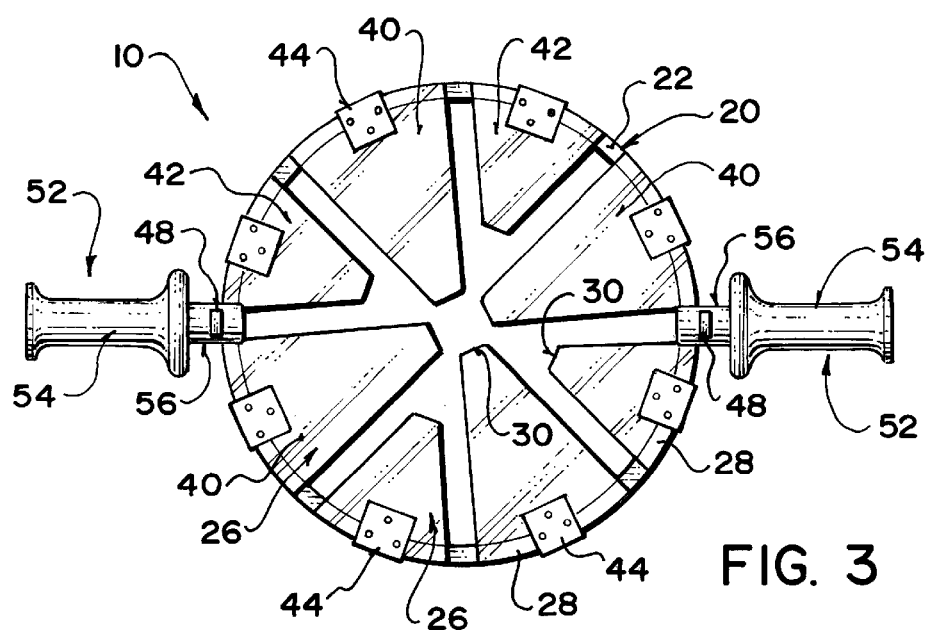
FIG. 3 is top plan view of the trap according to FIG. 1.
Figures 4, 5:
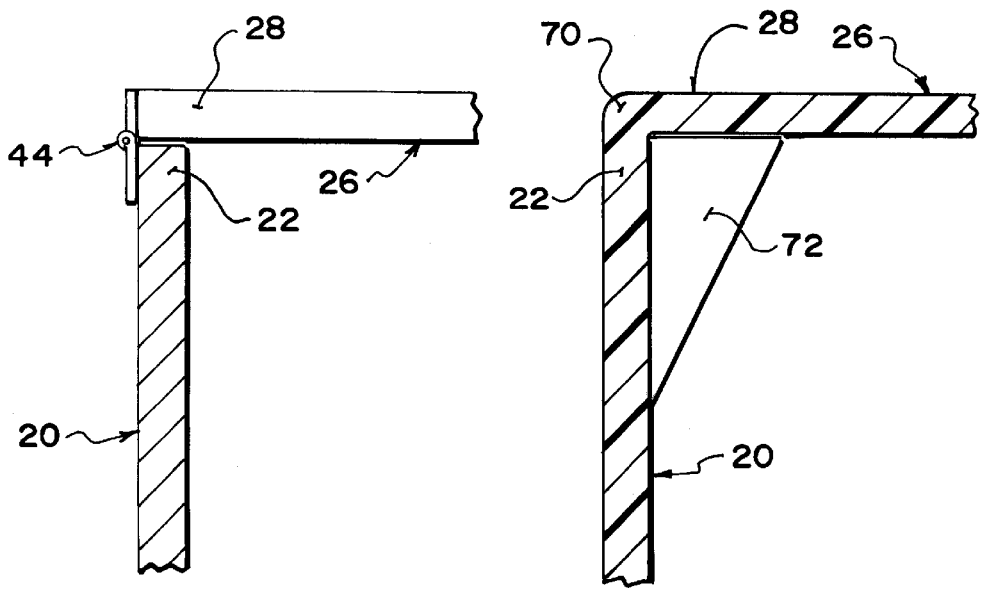
FIG. 4 is enlarged sectional view of a retainer member according to the trap of FIG. 1 shown mounted on the frame by a hinge.
FIG. 5 is a view similar to that of FIG. 4 of a different embodiment of the present invention wherein the retainer member is integrally mounted on the frame and arranged to be flexed between respective open and closed positions.

As shown in more detail in FIG. 4 each retainer member 26 is mounted at its respective base 28 on the top side of the collar 20 by a hinge 44 mounted on an outer side of the collar. Locating the hinge 44 on the outer side of the collar permits the retainer member to rest on the top side of the collar in the closed position such that the top side of the collar acts as a stop to restrict downward pivotal movement of the retainer member relative to the collar. The retainer members 26 are thus each mounted for pivotal movement between a closed position as illustrated in FIG. 2 wherein the retainer members extend radially inward and a partially open position as shown in FIG. 1 wherein the retainer members are pivoted upwardly and outwardly along an arcuate path so as to provide a suitably sized opening therebetween to permit passage of a fish.

A support in the form of a pair of support arms 48 is provided to suspend the collar 20 within the ice fishing hole as illustrated in FIG. 1. Each support arm 48 is an elongate member arranged to be supported in tension for mounting the collar on a bottom end thereof such that each support arm extends upwardly and outwardly from a topside of the collar. The arms 48 are mounted on diametrically opposed sides of the collar to provide a stable arrangement for suspending the collar therefrom. Each support arm includes a hinged joint 50 therein for permitting the support arms to be folded and collapsed into a storage position.

A handle 52 is adjustably mounted on each support arm 48 to extend radially outward therefrom. The handles 52 are thus arranged to be supported on a topside of the sheet of ice 14 to suspend the support arms and collar therefrom. Each handle includes a gripping portion 54 which may be formed of any suitable material for example wood, wherein the gripping portion is suitably contoured to be gripped by a person's hand. The handle further includes a screw lock mechanism 56 which is slidably mounted on the respective support arm 48 for longitudinal sliding movement there on. By appropriately turning the gripping portion 54 with a person's hand the screw lock mechanism 56 is selectively locked in place at any one of numerous longitudinal positions along the support arm 48. The relative height between the handles 52 and the collar 20 is thus adjustable for locating the collar at any one of numerous selected depths within the ice fishing hole.

Each arm preferably includes a plurality of depth markings longitudinally spaced along the arms at evenly spaced locations so as to provide an indication of the depth of the collar 20 corresponding to a longitudinal position of the handle relative to the support arm 48.

In use a person first bores an ice fishing hole into a sheet of ice and positions the trap 10 within the hole as illustrated in FIG. 1. A relative height of the handles 52 is adjusted such that the bottom side 24 of the collar 20 is spaced upwardly from a bottom surface 60 of the ice sheet a distance preferably in the order of approximately half an inch. The bottom of the collar thus provides little obstruction to a fish passing through the opening therein.

Once the trap has been set within the ice fishing hole an individual may proceed to fish therethrough by inserting a fishing line through any one of the multiple spaces between adjacent retainer members 26 when in the closed position of FIG. 2. The ample space between the retainer members allows the fishing line to easily be treaded therethrough regardless of the various types of conventional fishing lures mounted thereon.

Once the individual is aware that a fish has been caught on the fishing line inserted through the trap the person proceeds to pull the fish upwardly through the opening in the collar 20. As the fish is pulled towards the retainer members 26 the retainer members guide the fish towards the center of the opening such that as the fish is pulled therethrough the free ends of the respective retainer members engage opposing sides of the fish as illustrated in FIG. 1.

The collar 20 is submerged well below a water level line 62 such that the fish remains submerged while being pulled between the retainer members 26 through the collar. The fish is thus substantially clear or at least partway through the retainer members 26 so as to be gripped therebetween before the fish is pulled out of the water. As soon as the fish is pulled out of the water the loss of buoyancy of the fish provides an added force of resistance that would otherwise possibly allow the fish to come loose from the fishing line and fall back into the ice fishing hole if the trap 10 were not in place. Furthermore in this arrangement the fish is already substantially gripped by the retainer members 26 before the fish begins to fight violently against the fishing line once it is exposed to the surface air.

In a further arrangement as illustrated in FIG. 5 the retainer members 26 may be integrally mounted at their respective bases 20 with the top side 22 of the collar by forming a flexible joint 70 of resilient plastic material therebetween. In this arrangement the free ends of the retainer members remain pivotal in an upwardly and outwardly arcuate path from the closed position to the open position by flexing the plastic material at the respective bases of the retainer members. The retainer members 26 thus act similarly to those in the first embodiment described herein.

In order to provide added resistance to downward pivotal movement of the retainers the collar 20 of the embodiment of FIG. 5 preferably includes a plurality of support members 72 mounted on an inner side thereof to extend radially inward along the bottom side of each retainer member only partway towards a free end thereof. The retainer members 26 rest freely on a top side of the respective support members 72 so as not to restrict upward pivotal movement thereof but so as to act only as a stop to inhibit downward pivotal movement of the retainer members.

In further embodiments any arrangement wherein there is provided a frame structure for positioning about a periphery of the ice fishing hole and a plurality of gate members mounted to extend radially inward from the frame across an opening therein would function adequately if the gates are mounted to be moveable substantially only in an upward direction. The gate members would thus allow the fish to pass from a bottom side of the ice fishing hole to a top side of the ice fishing hole while restricting movement in the reverse direction. Any arrangement of multiple gate members extending radially inwards towards an intermediate located within an opening in the frame structure would permit the gates to act as in the present invention to grip a fish caught partway therethrough between the respective free ends of the gate members.

In order to simplify manufacturing of the trap, the retainer members and the collar in an alternative arrangement may be integrally moulded in a single piece of plastic material similarly to the configuration of FIG. 5. The collar may further be formed as a continuous band which can be cut to length corresponding to a desired circumference of the finished trap. A suitable fastener would thus allow the size of the collar to be adjusted to any one of numerous conventional sizes of ice fishing holes corresponding to different conventional sizes of ice boring tools.

While one embodiment of the present invention has been described in the foregoing, it is to be understood that other embodiments are possible within the scope of the invention. The invention is to be considered limited solely by the scope of the appended claims.

What is claimed is:

1. A trap for trapping a fish within an ice fishing hole, the trap comprising:

a frame comprising a collar for being received in the ice fishing hole so as to be arranged to extend across the hole, the collar having an opening extending therethrough between respective top and bottom sides thereof;

a support extending upwardly and outwardly in relation to the top side of the collar for suspending the collar therebelow within the hole, the support comprising at least one support arm extending upward from the top side of the collar, the at least one support arm mounting a handle thereon which extends radially outward from the at least one support arm to engage a top side of a sheet of ice in which the ice fishing hole is located and suspend the collar therefrom;

a plurality of retainer members mounted on the collar at spaced positions around a periphery of the opening, the retainer members comprising flat plate members being movable between a closed position wherein the retainer members extend inwardly from the periphery of the opening to respective blunt free ends suspended partway across the opening and an open position wherein the retainer members extend upwardly from the periphery of the opening so as to permit passage of the fish through the opening;

and a stop arranged to restrict downward movement of the retainer members in the closed position.

2. The trap according to claim 1 wherein each retainer member is a generally triangular member extending from a base thereof mounted on the collar and tapering inwardly towards the free end thereof.

3. The trap according to claim 1 wherein the retainer members are evenly spaced circumferentially about the opening.

4. The trap according to claim 1 wherein the plurality of retainer members comprise at least two different sizes of retainer members spanning across the opening in varying amounts in the closed position so as to grip a fish therebetween when the retainer members are in the open position at multiple locations along the fish.

5. The trap according to claim 4 wherein the plurality of retainer members comprises a plurality of primary retainer members each having one of said free ends which is positioned adjacent a centre of the opening in the closed position and a plurality of secondary retainer members mounted between the respective primary retainer members wherein each secondary retainer member extends only partway towards the centre of the opening in the closed position.

6. The trap according to claim 1 wherein there is provided a space between each pair of adjacent retainer members, the space being suitably sized to receive a fishing line therethrough.

7. The trap according to claim 1 wherein the retainer members are formed of a substantially transparent material.

8. The trap according to claim 1 wherein the stop comprises a shoulder on the collar and wherein each retainer member is mounted on the collar such that a portion of the retainer member rests on the shoulder in the closed position.

9. The trap according to claim 1 wherein the stop comprises a stop member associated with each retainer member, each stop member being mounted on the collar for restricting pivotal movement of the retainer member in a downward direction towards the bottom side of the collar from the closed position.

10. The trap according to claim 1 wherein there is provided a hinge mounting each retainer member on the collar for pivotal movement of the respective free ends of the retainer members relative to the collar.

11. The trap according to claim 1 wherein each retainer member includes a base of flexible material opposite the free end thereof which mounts the corresponding retainer member on the collar for relative pivotal movement by flexing the base.

12. The trap according to claim 1 wherein there is provided an adjustable mount mounting the handle on the at least one support arm such that the handle is adjustable in height relative to the at least one support arm for suspending the collar within an ice fishing hole at different relative heights.

13. The trap according to claim 12 wherein there is provided a plurality of evenly spaced markings along the at least one support arm for indicating a depth at which the collar is suspended within an ice fishing hole.

14. The trap according to claim 1 wherein there is provided a pair of the support arms mounted on the collar on diametrically opposed sides of the opening, each support arm mounting a handle thereon.

15. The trap according to claim 1 wherein the at least one support arm includes a folding joint therein such that the at least one support arm is collapsible in length for storage.

16. A method for trapping a fish in an ice fishing hole in a sheet of ice lying over a body of water, the method comprising:

providing a frame comprising a collar having a circumference substantially equal to the ice fishing hole so as to substantially fully extend across the ice fishing hole, the collar having an opening extending therethrough between respective top and bottom sides thereof;

providing a support extending upwardly and outwardly in relation to the top side of the collar;

suspending the collar from the support within the ice fishing hole;

providing a plurality of retainer members mounted on the collar at spaced positions around a periphery of the opening, the retainer members comprising flat plate members being movable between a closed position in which the retainer members extend inwardly from the periphery of the opening to respective blunt free ends and an open position wherein the retainer members extend upwardly from the periphery of the opening so as to permit passage of the fish through the opening;

suspending the retainer members in the closed position to extend partway across the opening below a water level in the ice fishing hole;

restricting downward movement of the retainer members in the closed position;

extending a fishing line down through the collar; and pulling the fishing line up through the collar once a fish has been caught on a free end thereof.

17. The method according to claim 16 wherein the retainer members are arranged to remain submerged below the water level as they are displaced between the closed and open positions.

18. The method according to claim 16 wherein each retainer member includes an integral base of flexible material opposite the free end thereof which mounts the retainer member on the collar for relative pivotal movement, and wherein the method includes flexing the base as the retainer members are displaced between the open and closed positions.

* * * * *